Oct. 30, 1951 A. R. PERL 2,573,271
ROADABLE AIRCRAFT
Filed June 30, 1947 3 Sheets-Sheet 2
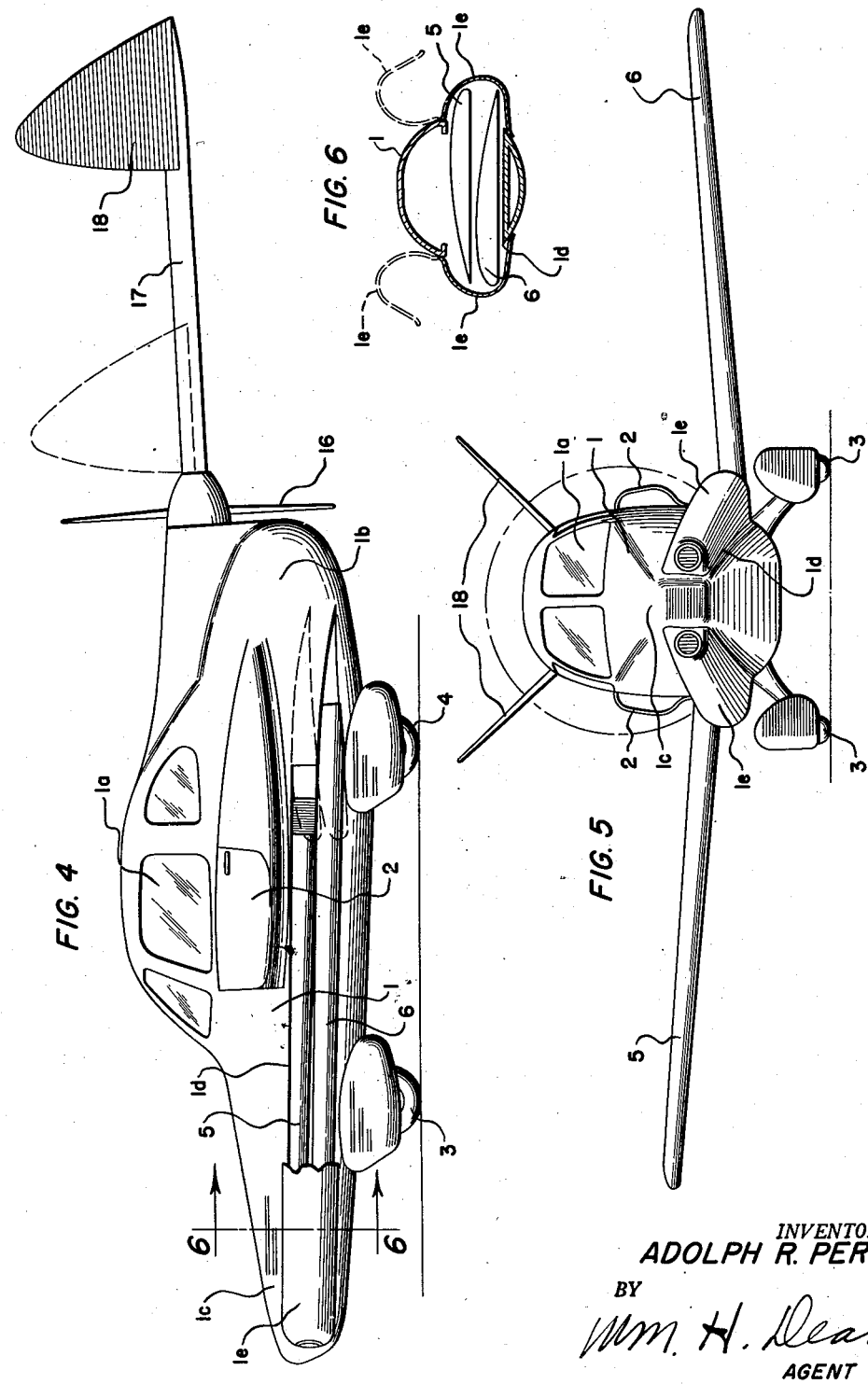
INVENTOR.
ADOLPH R. PERL
BY
Wm. H. Dean
AGENT Oct. 30, 1951     A. R. PERL     2,573,271
ROADABLE AIRCRAFT
Filed June 30, 1947     3 Sheets-Sheet 3
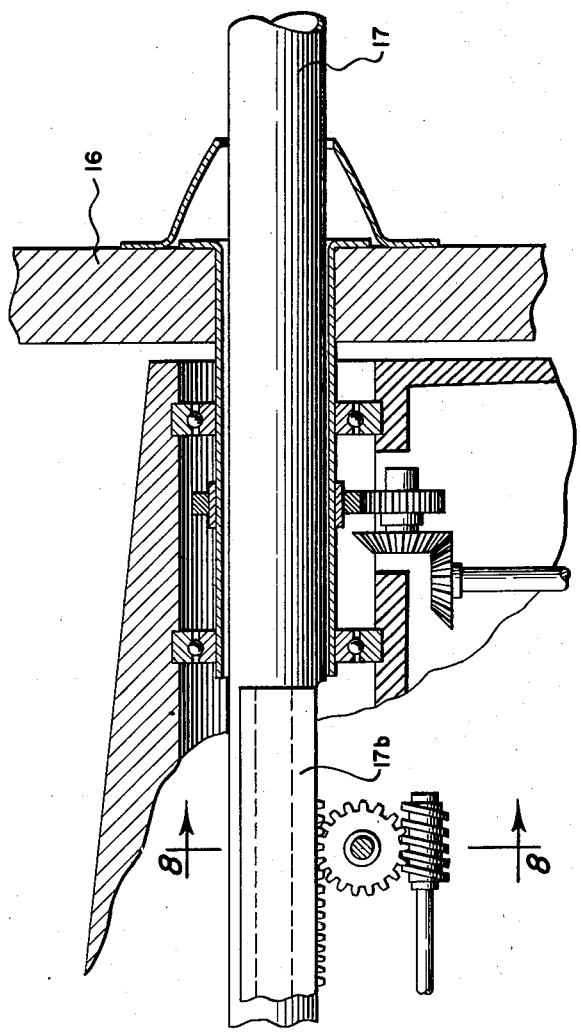
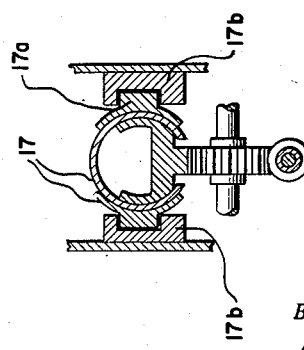
INVENTOR.
ADOLPH R. PERL
BY
Wm. H. Dean
AGENT Patented Oct. 30, 1951

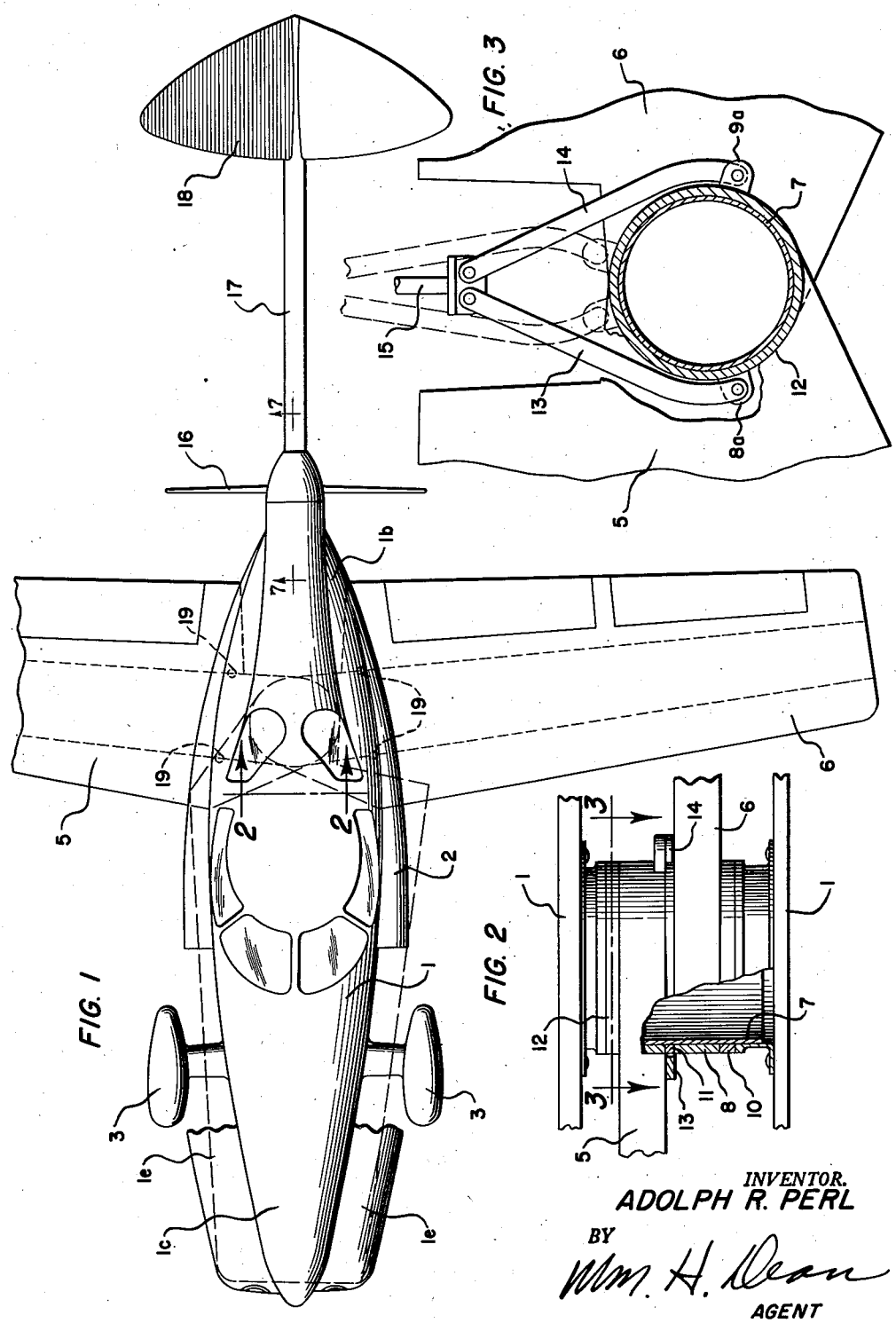

2,573,271

UNITED STATES PATENT OFFICE 2,573,271

ROADABLE AIRCRAFT

Adolph R. Perl, San Diego, Calif.

Application June 30, 1947, Serial No. 758,059

4 Claims. (Cl. 244—2)

My invention relates to a roadable aircraft, more particularly to an aircraft having folding multiple wings and retractable tail boom, and the objects of my invention are:

First, to provide an aircraft of this class which can be very readily and very quickly converted from an aircraft to a roadable vehicle;

Second, to provide a roadable aircraft of this class in which the wings are foldable into the body of the fuselage longitudinally thereof, presenting an overall breadth of the roadable aircraft at the fuselage portion thereof substantially equal to the chord of the wings when in folded position;

Third, to provide a roadable aircraft of this class in which the center of gravity thereof is changed by the pivotal movement of the wings when folding whereby forward movement of said center of gravity is changed to the desirable position for roadwork and is proper with respect to the wing when the wings are in extended position for flight;

Fourth, to provide a roadable aircraft of this class having a retractable tail boom which greatly reduces the overall length of the vehicle when operated on the ground;

Fifth, to provide an aircraft having novel folding wings which are retractable into the fuselage of said aircraft;

Sixth, to provide a roadable aircraft of this class having novel air scoop means in connection with the doors of the fuselage thereof for directing air backwardly into the engine at the rear of said fuselage;

Seventh, to provide a roadable aircraft of this class which is properly balanced when in various operating conditions and in which the wings thereof are foldable in superimposed relationship to each other for attaining such balance;

Eighth, to provide a novel means for folding aircraft wings into superimposed parallel relationship with each other whereby a very compact roadable aircraft may be produced;

Ninth, to provide a roadable aircraft of this class having four wheels which operate equally as well on the ground or in connection with the aircraft when taking off or landing; and Tenth, to provide a roadable aircraft of this class which is very simple and economical of construction in accordance with its utility, efficient in operation and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Fig. 1 is a fragmentary top or plan view of my roadable aircraft, showing by dash lines varying positions of parts thereof, Fig. 2 is an enlarged fragmentary sectional view taken from the line 2—2 of Fig. 1, showing portions further broken away and in section to amplify the illustration, Fig. 3 is a fragmentary plan sectional view taken from the line 3—3 of Fig. 2 showing by dash lines varying positions of parts thereof, Fig. 4 is a side elevational view of my roadable aircraft showing by dash lines varying positions of parts thereof, Fig. 5 is a front elevational view of my roadable aircraft, Fig. 6 is a transverse sectional view through the fuselage thereof taken from the line 6—6 of Fig. 4. Fig. 7 is an enlarged sectional view, taken from the line 7—7 of Fig. 1; and Fig. 8 is a sectional view, taken from the line 8—8 of Fig. 7.

Similar characters of reference refer to similar parts and portions throughout the several views of the drawings.

The fuselage 1, doors 2, wheels 3 and 4, wings 5 and 6, wing root hub 7, wing root bearings 8 and 9, spacers 10, 11 and 12, links 13 and 14, actuator rod 15, propeller 16, tail boom 17, tail 18 and the drag pins 19 constitute the principal parts and portions of my roadable aircraft.

The fuselage 1 is provided with a passenger compartment 1a having an engine compartment 1b rearwardly thereof and a forwardly projecting portion 1c arranged to receive the wings of the aircraft when in folded position substantially parallel to the axis of said aircraft. The forwardly projecting portion 1c is provided with a slotted portion 1d therein arranged to retain the wings 5 and 6 in superimposed spaced relation to each other and this slotted portion extends rearwardly to a location below the passenger's compartment 1a and terminates forwardly of the engine compartment 1b, all as shown best in Fig. 4 of the drawings. The wings 5 and 6 are hinged on the longitudinal axis of the aircraft and the roots of the wings rotate about the vertical axis of the wing root hub 7 which is interposed between the upper and lower structure about the slotted portion 1d in the fuselage 1. The wing root hub 7 consists of a cylindrical member having a bearing surface at the outer side thereof on which the wing root bearings 8 and 9 are pivotally mounted. These bearings 8 and 9 are spaced by means of the spacers 10, 11 and 12 and in connection with each of the bearings 8 and 9 is a projecting lug as shown in Figs. 2 and 3 of the drawings. The bearing 8 is provided with a projecting lug 8a and the bearing 9 is provided with a projecting lug 9a, as shown in Fig. 3 of the drawings, to which the link 14 is pivotally connected. The link 13 is pivotally connected to the projecting lug 8a of the wing root bearing 8 and both of the links 13 and 14 are pivotally connected to the actuator rod 15 which is a rectilinear rod and power operated. The drag pins 19 are shear pins and are projected through the root portion of the wings 5 and 6 when in the extended position, as shown in Fig. 1 of the drawings, to prevent axial movement of the wings about the vertical axis of the wing root hub 7. The propeller 16 is mounted on a hollow shaft through which the tail boom 17 extends and in which it is reciprocally and non-rotatably mounted. The tail boom 17 is provided with runners 17a, which slide in grooves 17b in the aircraft fuselage, as shown best in Fig. 8 of the drawings, which runners and grooves prevent the tail boom 17 from rotating. When in the extended position, as shown in Fig. 4 of the drawings, the tail 18 in connection with the tail boom 17 is arranged for flight operation. The tail 8 consists of two upwardly diverging tail surface members, as shown in Fig. 5 of the drawings. The forward portion 1c of the fuselage 1, at the slotted portions 1d therein, is provided with a pair of pivoted fairing doors 1e which pivot downwardly and inwardly, as indicated by dash lines in Fig. 6 of the drawings, to a flush position with the outer side of the fuselage when the wings are extended ready for flight.

The wheels 3 are stationarily mounted in connection with the fuselage 1 at the lower side thereof and the wheels 4 are mounted rearwardly of the wheels 3 near the engine in the compartment 1b of the fuselage 1 and the wheels 4 are powered while the wheels 3 are steerable and these wheels 3 and 4 provide for land transportation similar to automobile wheels and also serve the roadable aircraft when landing and taking off.

The operation of my roadable aircraft is substantially as follows:

When the wings 5 and 6 are extended, as shown in Figs. 1 and 5 of the drawings, and the tail boom 17 is extended to the solid line position, as shown in Fig. 4 of the drawings, the roadable aircraft is ready to fly, it being noted, however, that the drag pins 19 must be positioned in shear before taking off. In flight, the air scoop portions protruding from the doors 2 conduct air backwardly into the engine compartment 1b which drives the propeller 16. When landing, the wheels 3 and 4 operate to provide stable wheel bearing on the runway and after landing the drag pins 19 are pulled and the wings 5 and 6 are hinged forwardly into superimposed relationship about the axis of the wing root hub 7. This pivotal movement of the wings 5 and 6 is accomplished by the links 13 and 14 in connection with the actuator rod 15 which moves into the dash line position as shown best in Fig. 3 of the drawings. When the wings are in the position as shown in Fig. 6 of the drawings, in parallel relationship to the axis of the fuselage 1 and the tail boom 17 is retracted to the dash line position, as shown in Fig. 4 of the drawings, the engine in the engine compartment 1b operates the rear wheels whereby the roadable aircraft is substantially a conventional motor vehicle similar to automobiles now in operation.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an aircraft of the class described the combination of a fuselage having a longitudinally horizontally disposed slotted portion extending through opposite sides thereof, a pair of pivoted wings pivotally mounted on a substantially vertical axis, rearwardly of said slotted portion and movable into said slotted portion in superimposed spaced relation to each other, a propeller at the rear end of said fuselage having a hollow hub and a tail boom extending therethrough and non-rotatably mounted in said fuselage provided with upwardly diverging tail surfaces at the rear end thereof.

2. In an aircraft of the class described, the combination of a fuselage having a longitudinally horizontally disposed slotted portion extending through opposite sides thereof, a pair of pivoted wings pivotally mounted on a substantially vertical axis rearwardly of said slotted portion and movable into said slotted portion in superimposed spaced relation to each other, a propeller at the rear end of said fuselage having a hollow hub, a tail boom extending therethrough and non-rotatably mounted in said fuselage provided with upwardly diverging tail surfaces at the rear end thereof and air scoops at opposite sides of said fuselage communicating with the rear engine compartment of said fuselage.

3. In an aircraft of the class described the combination of an operator's compartment, a forwardly extending fuselage portion, a rearwardly extending fuselage portion having an engine compartment therein, a pair of wings pivotally mounted in connection with said fuselage, said fuselage provided with a slotted portion longitudinally thereof and forwardly of the pivotal axis of said wings into which said wings are pivoted substantially parallel to the axis of said fuselage, said wings pivoted on a substantially vertical axis and foldable into said fuselage in superimposed spaced relation to each other, a propeller at the rear of said fuselage adjacent said engine compartment having a hollow hub and a tail boom extending therethrough and non-rotatably mounted in said fuselage.

4. In an aircraft of the class described the combination of an operator's compartment, a forwardly extending fuselage portion, a rearwardly extending fuselage portion having an engine compartment therein, a pair of wings pivotally mounted in connection with said fuselage, said fuselage provided with a slotted portion longitudinally thereof and forwardly of the pivotal axis of said wings into which said wings are pivoted substantially parallel to the axis of said fuselage, said wings pivoted on a substantially vertical axis and foldable into said fuselage in superimposed relation to each other, a propeller at the rear of said fuselage adjacent said engine compartment having a hollow hub, a tail boom extending therethrough and non-rotatably mounted in said fuselage and said tail boom provided with upwardly diverging tail surfaces thereon.

ADOLPH R. PERL.

REFERENCES CITED

The following references are of record in the file of this patent:

UNITED STATES PATENTS

| Number | Name | Date |
|---|---|---|
| 1,731,757 | Tubbe | Oct. 15, 1929 |
| 1,928,336 | Kindelberger | Sept. 26, 1933 |
| 2,241,577 | Beals | May 13, 1941 |
| 2,410,239 | Roe | Oct. 29, 1946 |
| 2,424,889 | Holmes | July 29, 1947 |

FOREIGN PATENTS

| Number | Country | Date |
|---|---|---|
| 256,743 | Great Britain | Aug. 19, 1926 |